Nov. 27, 1923.  1,475,630
A. HERZ
THERMALLY CONTROLLED CIRCUIT BREAKER
Filed April 11, 1921    2 Sheets-Sheet 1

Inventor
Alfred Herz
By Mason, Fenwick & Lawrence
Att'ys

Nov. 27, 1923.
A. HERZ
1,475,630
THERMALLY CONTROLLED CIRCUIT BREAKER
Filed April 11, 1921    2 Sheets-Sheet 2
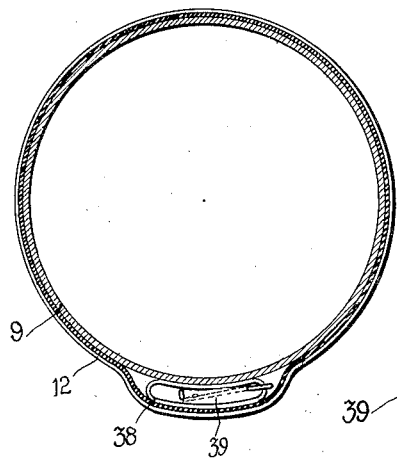
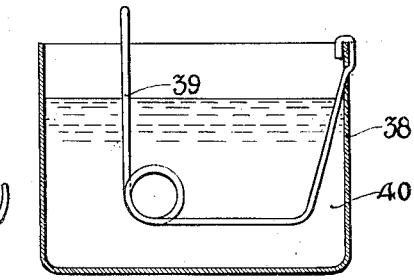
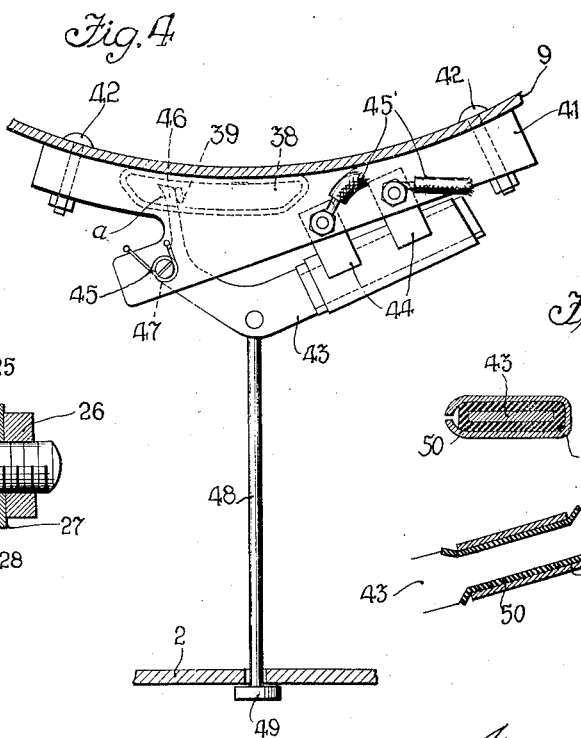
Inventor
Alfred Herz
By Brown Boettcher Denise
Attys Patented Nov. 27, 1923.

1,475,630

UNITED STATES PATENT OFFICE.

ALFRED HERZ, OF CHICAGO, ILLINOIS.

THERMALLY-CONTROLLED CIRCUIT BREAKER.

Application filed April 11, 1921. Serial No. 460,189.

*To all whom it may concern:*

Be it known that I, ALFRED HERZ, a citizen of the United States, residing at Chicago, in the county of Cook and State of Illinois, have invented a certain new and useful Improvement in Thermally-Controlled Circuit Breakers, of which the following is a full, clear, concise, and exact description, reference being had to the accompanying drawings, forming a part of this specification.

My invention relates to thermally controlled circuit breakers. While I have shown and described the invention particularly as applied to water heaters, the invention is not to be limited to such use.

It is true that the invention is peculiarly adapted to employment in a heating circuit, as will be apparent later, but it is to be understood that the invention is also valuable for general control work of power, lighting and the like circuits.

My invention is based upon the fact that the development of heat is the safest and surest indication of the flow of power in an electric circuit, and certain results can be secured by depending upon the heating effect of the current, which cannot be secured through utilization of the magnetic or other effects.

I provide a thermally controlled element subject to the flow of current or a portion thereof, which element holds a switch, or other circuit-controlling device, in such position that so long as no excessive heat is developed, the circuit will be uninterrupted, but as soon as the thermally controlled element registers an undue rise of temperature, the circuit is opened by the release of the switch, or other circuit controller.

It is an important feature of my invention that the thermally controlled element releases a switch which normally tends to move, as for instance to open position, but the switch is restrained from such movement by the thermally controlled element, and that the switch cannot be made to remain in said position until the temperature of the thermally controlled element is lowered to a predetermined point.

This feature of the invention makes it ideal for heating devices which should be permitted to cool before it is again possible to re-apply the heating current. As an example of this, I refer to heating vessels for heating liquids, such as water.

I am aware that it has been customary heretofore in certain arts to hold a switch closed by means of a fuse, which fuse is destroyed upon excessive current flow, and which fuse must then be replaced.

My invention, however, is fundamentally different, in that the thermally controlled element is subject not to the current flow directly; in fact, it has no relation to current flow, as such, and furthermore the melting or operation of the thermally controlled element does not destroy it, as is the case of the well-known fuse.

I shall describe my invention more particularly in connection with a heating device known generally as a steam table. A steam table is employed in restaurants, on lunch counters, and the like, for keeping food hot, and yet accessible for service or for inspection. A steam table generally contains a number of pans or vessels containing the food, which are set in openings in the top of a steam chest, the lower portion of which contains water, and which lower portion is generally provided with one or more wells in the shape of cylindrical tanks, secured at their upper ends by a soldered seam to the bottom of the steam chest, and provided with heating elements wrapped around the cylindrical portion thereof. A housing or casing surrounds the lower end of the steam table, and supports the steam chest and the vessels containing fluid at a suitable height above the floor. Due to the enclosed character of the heating wells, it is difficult to secure access to the same without removing the vessels or pans containing fluid, and turning the entire device upside down.

If the water is permitted to get so low in the steam chest and heating wells that the soldered joint between the flange of the heating vessels and the bottom of the steam chest is exposed, the solder may be melted, and the vessel then destroyed.

According to my invention, I provide a small auxiliary well, which lies between the heating coils and the walls of the water well or boiler, and which is subjected to the heat of the heating coil. This well is preferably placed adjacent the top of the water well, so that the lowering of the water below the seam which is to be protected affects at once the auxiliary well.

The auxiliary well contains a body of material, preferably a metal, which will melt before the solder of the joints which are to be protected will melt. Melting of the thermostatic metal permits the switch to open. Preferably to carry out this mode of operation, I provide a spring finger in the body of the thermostatic material, which, when held by the freezing of the thermostatic metal, offers sufficient resistance to the switch to prevent the switch opening, but which, when the thermostatic metal is melted, offers insufficient resistance to the opening of the switch, so that the circuit is broken. This spring is self-setting, and as soon as the thermostatic metal freezes around it, the switch may again be closed; but until the thermostatic metal does actually solidify about the spring, the spring has insufficient rigidity to hold the switch in closed position; hence, the switch cannot be closed until the device has cooled off.

The invention is not to be limited to heating vessels of this character, as it may be applied to all kinds of electrical apparatus in which there is danger of over-heating, whether these devices be fundamentally heating devices or power devices; for instance, a thermostatic controlling well of this character may be attached to a motor or generator frame, or may be entirely separate, and thus making use of the heating effect of the current only, in which case the container of the thermostatic material is surrounded by a heating coil. Sufficient current to cause damage to the apparatus to be protected will also cause the thermostatic material to melt, or it may be subjected to a part of the current which flows in series through the instrument, if desired.

While I shall describe the invention as particularly applied to the protection of a soldered seam in the heating vessel, it is to be understood that the protection may be extended to any part of the vessel or the whole vessel. That is to say, the use of my invention permits of a safeguarding of the vessel as a whole, or any particular part which is subject to damage by heat.

In the accompanying drawings, in which I have illustrated one embodiment of the invention:

Figure 4 is a top plan view of the circuit breaker, illustrating the manner of securing it to the heating vessel;

Figure 5 is a horizontal sectional view of the vessel illustrating the manner of retaining the well adjacent to the vessel;

Figure 6 is a transverse sectional view of the well;

Figure 7 is a fragmentary detail view of the holding spring;

Figure 8 is a cross sectional view of the switch blade;

Figure 9 is a fragmentary detailed view, illustrating the manner of constructing the switch blade;

Figure 10 is a detail view of terminals employed to anchor to the vessel the outer ends of the heating coils; and, Figure 11 is a diagrammatic illustration of the circuit breaker of my invention embodied in a motor circuit.

Figure 1:
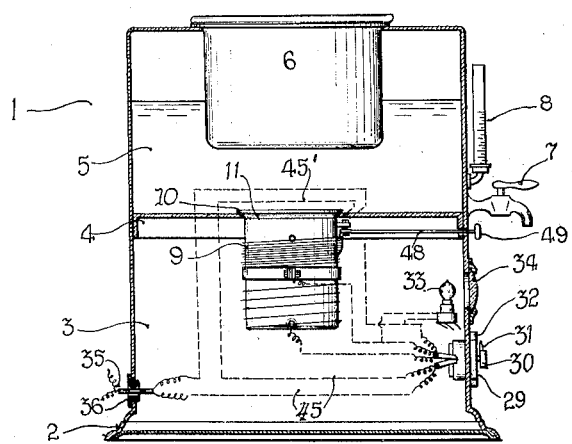
Figure 1 is a vertical sectional view of the water heater or steam table.
Figure 2:
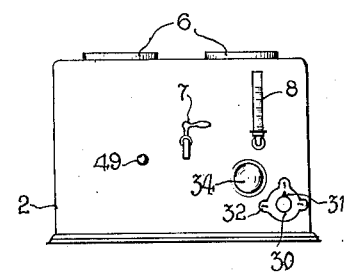
Figure 2 is a front elevational view of the same drawn at a reduced scale.

Referring more particularly to the water heater, the steam table 1 comprises the base 2, the lower compartment 3 divided by the wall 4 from the upper compartment or reservoir 5, which I term the steam chest, in which the steam is generated and retained, and a greater portion of the water is held. The warming pots 6 are suitably retained in the top wall and are partially submerged in the hot water and partially exposed to the steam, as is well known in the art. A faucet 7 is provided for the purpose of draining the reservoir 5, or drawing off a small quantity of hot water for use, which is replenished in any suitable way, such as a connection leading to a suitable source of supply (not shown). A gauge 8 has also been provided to indicate the level of the water in the reservoir.

In the lower compartment 3 a heating vessel 9 is disposed, which vessel may be suspended from bottom wall 4, so that the interior of the vessel 9 has communication with the upper compartment or reservoir 5. This vessel 9 is provided with a rim 10 at the open end and secured preferably by soldering, as indicated at 11, because of the cheapness of such a joint. A pair of heaters 12 and 13 are arranged to heat the heating vessel 9 to bring the liquid to the desired temperature. The heater 12 comprises a winding of a number of turns of fine wire, and the heater 13 comprises a winding of a number of turns of coarser wire, so that the wattage consumed by the heater 12 is considerably less than the wattage consumed by the heater 13. The windings 12 and 13 are wound upon the vessel with a layer of insulation interposed to prevent short-circuiting of the turns. The upper end of the coil 12 is secured by the terminal 14, to be later described in detail, while the lower end is embraced by a clamping band 15 which mechanically secures the end of the winding and forms an electrical terminal therefor.

Likewise, the upper end of the winding 13 is embraced by the band 15 also serving as an electrical terminal and securing means therefor. A layer of insulation 16 is interposed between the windings 12 and 13 and the split band 15. The lower end of the coil 13 is anchored by the terminal 17 which is constructed similar to the terminal 14.

It is to be noted from Figure 10 that these terminals are insulated from the heating vessel 9 and comprise essentially the threaded stud or bolt 18 formed at the inner end with an overturned head which is brazed to the heating vessel 9. To insulate the bolt 18, an insulation sleeve 19 is provided thereon adjacent to the wall of the vessel, the end abutting the wall being formed with a flange 20 against which bears the metallic washer 21. The lead 22 from the winding is gripped between the washer 21 and a similar washer 23, while the external lead 24 may be gripped by an additional washer 25. To insulate the latter washer from the nut 26 at the end of the bolt 18, a collar of insulation 28 is interposed. The washer 27 spacing the nut 26 from the collar 28 firmly bears the latter against the remaining washers. The arrangement is such that the collar of insulation 28 partially bears upon the insulation sleeve 19 so as to space the washer 27 from the washer 25.

The heaters 12 and 13 are controlled by the switch 29, which is operated by means of the handle or knob 30 having formed thereon a pointer 31. A suitable plate or escutcheon 32 is carried by the protruding portion of the switch 29. The switch 29 has three positions which are indicated by suitable legends on the escutcheon 32, the first position being had when the heaters 12 and 13 are connected in the circuit in parallel relation. In the next position, the switch 29 connects the low wattage coil in the circuit, while in the last position the switch disconnects both of the coils so that they are inactive. The circuit is completely broken, and no heating of water takes place. A pilot light 33 which is mounted on a suitable support is permanently connected across the terminals 14 and 15 of the low wattage heater 12. A bull's eye or fresnel 34 is placed over an opening in the base to indicate the condition of the pilot light 33. The lead wire 35, which may be connected to a suitable terminal, enters the base through a suitable insulation 36.

Figure 3:
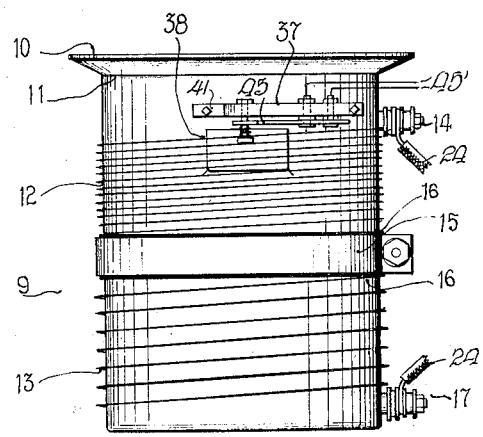
Figure 3 is an elevational view of the heating pan or vessel, illustrating the relative position of the circuit breaker on the pan.

The circuit is controlled by the temperature controlled switch 37, which is automatically governed by the temperature of the heating vessel 9. As shown in Figures 3 and 5, a well 38 is interposed between the low wattage coil 12 and the heater 9, substantially beneath the soldered joint 11 of the rim 10 and heater 9. The well 38 has anchored therein the holding spring 39, which, at one end, is clamped around the edge of the well to secure a suitable fastening, and which, at the other end, projects out of the well 38, being bent back upon itself to stiffen that end. The spring 39 is embedded in this well by the fusible material 40, which is subject to fusion before the solder at 11. Hence, the spring 39 will not be free to move until the temperature has risen to the predetermined maximum, which point may be varied by employing materials having different temperatures of fusion.

Directly above this well 38 a block 41 is suitably secured to the vessel 9, as by bolts 42, and upon this block the switch blade 43 is pivotally carried. A pair of electrical contacts 44 are provided upon the block 41, and are shunted by the leads 45' across the main circuit comprising the leads 45'. The switch blade 43 is formed elbow shaped, having the shorter arm pivoted to the block by means of the bolt 45, and provided with a downwardly extending detent finger 46 adapted to engage with the holding spring 39. A releasing spring 47 is coiled about the bolt 45, and connects at one end with the switch blade 43, so that the action thereof tends to open the circuit by causing the blade 43 to swing outwardly. In order to reset the switch blade with as little difficulty as possible, after the former has been automatically actuated and the circuit broken, upon the fusion of the material 40 within the well, I propose to employ means providing remote control of the blade. Preferably, this control is had without the casing 2, so that the heater 9 may be put into operation immediately upon restoring the water to the normal level, and cooling the auxiliary well to the point where the metal freezes. A rod 48 pivotally connects with the blade 43, and projects forwardly and through the casing 2, having at its end a button 49. Other resetting means may be provided, such as a rotating button and rod, if so desired.

In order to insulate the live end of the switch blade 43 from the remaining portion thereof, so as to prevent grounding or short-circuiting of the current on the frame of the device, the longitudinal edges of the blade at this end are formed with heavy cutaway portions so as to anchor a sleeve of insulation 50 thereabout (Figures 8 and 9). A metallic sleeve 51 surrounds the sleeve 50, and serves as the conductor between the pair of contacts 44, displacement of the sleeve 51 being prevented by the upturned edges of the sleeve of insulation lying against the shoulders formed by the cutaway portions of the blade proper.

Thus it is to be seen that as the well 38 is located adjacent to the joint 11, the fusible material 40 is subjected to the heat of that portion of the vessel, and therefore, the switch 37 will be actuated to render the heating coils 12 and 13 inoperative as soon as the temperature builds up to a point beyond safety for the joint. The well 38 being between the heating coil 12 and the vessel 9, the fusible material 40 will be governed directly by the heat of the coil 12, so that, if the water level recedes below the area adjacent the well, the heat will first directly act upon the material 40 before being transferred to the vessel 9.

The operation of the device is as follows:—

Suppose that, after the device is in operation for a considerable period of time, the level of the water in the compartment 5 lowers to a point below the seam 11 in the heating vessel 9. The water will no longer keep the fusible material cool and in a solidified state, and as a result, the heat from either the coil 12 or the coil 13 will act directly thereon. It will be noted that the auxiliary well containing the fusible material lies in the path of the heat which tends to travel to the joint 11 from either heating coil. When the coil 12 is active, it is obvious that heat from this coil in traveling toward the seam 11, will encounter the thermostatic well and fuse the material therein. When the coil 13 is active, the heat which travels toward the seam 11 along the wall of the vessel 9 will first encounter said thermostatic well, and cause fusion of the material in the same. The temperature will immediately rise to the temperature of fusion of the material 40, and cause it to melt, which releases the holding spring 39. The releasing spring 47, being of greater strength than the holding spring 39, when not supported by the rigidity of the fusible material 40, will cause the switch blade 43 to break the circuit between the contacts 44 by moving outwardly. This condition is immediately indicated by the going out of the pilot light 33, and also by the movement of button 49.

To restore the device to operation again, cool water is fed into the steam chest 5 until the proper level is reached, as indicated by the gauge 8. The holding spring will of course return to its upright position after the detent 46 of the switch blade 43 has tripped thereover, before the cool water freezes the fusible material 40. At this point the button 49 without the casing 1 is pushed inwardly, and by means of the rod 48, the switch blade 43 is swung closed. The detent 46 must pass the projecting end of the spring 39 as this is done, which is secured by tapering the edge $a$ of the detent.

Figure 11:
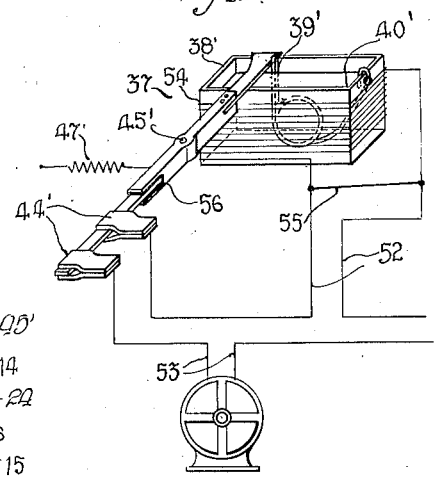

In Figure 11 I have shown the temperature controlled circuit breaker 37 in series relation with the motor circuit to prevent overheating of the motor winding. As is well known, a certain amount of heat accumulates or "builds up" in motor windings as the motor is in continuous service. This normally does no harm, because the movement of air through the motor while it is running dissipates enough heat to keep the temperature below the danger point. If the motor is subject to excessive load, or is stalled, the heat which results from excessive current flow will quickly raise the temperature to the danger point. I connect the switch control circuit 52 in series relation with the motor circuit 53, so that a certain proportion of the current flows through the coil 54.

The shunt 55 is employed to carry the major portion of the current, so that the capacity and the insulation of the control device 37 may be reduced. A transformer might be employed instead.

This coil 54 surrounds the well 38', in which a suitable fusible material 40' is contained. A spring 39' is anchored in the well 38', and embedded therein by the fusible material 40'. The switch being pivoted at 45', will tend to remain in engagement with the contacts 44' so long as the holding spring 39' is held rigid by the material 40', but as soon as the temperature rises in the motor, and hence in the coil 54, the holding spring 39' will be overcome by the opening spring 47', resulting in breaking of the motor circuit by the switch. That portion of the blade coming into contact with the terminals 44' is insulated from the rest of the blade by means of the insulation 56 interposed between these two parts, at a point where they meet to form a joint.

Here, the operation of the thermally controlled switch 37 is similar. The heat accumulates or "builds up" in the motor windings to a dangerous point, because of excessive current. A similar building up of the heat takes place in the winding 54 encircling the well 38, which will result in the melting of the fusible material 40' therein, whereupon the holding spring 39' is released. The releasing spring 47' then overcomes this holding spring 39', and the switch blade swings outwardly about the pivot 45', thereby breaking the circuit by disengaging the terminals 44'. The motor will be brought to rest and kept so until the windings thereof have cooled off, while at the same time the temperature of the controlling coil 54 is being brought back to normal because of the current not flowing. As soon as normalcy is again had, the fusible material 40' is frozen with the holding spring 39 in operative position. The switch blade is closed and the circuit again restored by engagement with the terminals 44'. The opposite end of the switch blade is provided with a finger formed with a tapered edge, which permits the finger to pass over the holding spring 39'.

From the foregoing description, the advantage of employing a thermally controlled circuit breaker where a temperature rise or accumulation of heat takes place in a device, which, when reaching a certain maximum, will break the circuit, is evident. The point at which the circuit breaker will actuate is dependent upon the temperature of fusion of the fusible material, which of course may be determinable by the use to which the device is put. In steam tables where the circuit breaker is inaccessible because of its peculiar location in relation to the other parts, the remote control is important, because of the labor and time saved in the resetting.

I claim:

1. In combination, a heating vessel adapted to contain a body of fluid, a heating circuit for heating said vessel, and a circuit breaker disposed between said circuit and said vessel and controlled by conduction of heat through the vessel for rendering said circuit inactive.

2. In combination, a support, a heating vessel, said vessel being connected to said support by a fusible joint subject to the heat of said vessel, an electric circuit for heating said vessel, a fusible element controlling said circuit, said fusible joint having a higher point of fusion than said means for breaking said circuit, said fusible element being disposed between said circuit and said vessel.

3. In combination, a heating vessel adapted to contain a body of fluid, an electric circuit for heating said body of fluid, a well between said circuit and vessel, releasable means within said well adapted to be released upon rising of the temperature in the vessel to a predetermined point, and a switch connected with said releasable means.

4. In combination, a heating vessel adapted to contain a body of fluid, an electric circuit for heating said body of fluid, a fusible element between said circuit and vessel and being subject to the heat thereof upon lowering of the fluid in the vessel, a switch controlled by said fusible element, and means for resetting said switch, at a distance therefrom.

5. In combination, a heating vessel adapted to contain a body of fluid, heating coils surrounding said vessel for heating the fluid, a body of fusible material adapted to melt upon a predetermined rise of temperature of the vessel, a resilient member partially submerged in said fusible material for reinforcement, a switch in the heating circuit and controlling the connection of the coils, said switch being held by said resilient member only when reinforced by said fusible material while in non-liquid condition.

6. In combination, a heating vessel adapted to heat a body of fluid, heating coils surrounding said vessel, a body of fusible material adapted to be interposed between the coils and heating vessel, a spring anchored in said fusible material, a spring-actuated switch in the heating circuit acting against said spring, said spring holding said switch closed while reinforced by said fusible material and releasing the switch as the temperature rises to a predetermined value.

7. In combination, a vessel, heating coils for said vessel, a body of fluid adapted to be subjected to the heat of said vessel, a well interposed between said vessel and heating coils so that it is subjected to the heat thereof, a body of fusible material in said well, a holding spring anchored in the well and reinforced by said fusible material, a switch in the heating circuit and acting against said holding spring, said heating circuit being interrupted upon melting of the material within the vessel.

8. In combination, a vessel, heating coils therefor, said vessel being formed with a soldered joint, a well interposed between said heating coils and said vessel and being located in effective position with respect to said soldered joint, fusible material in said well, a holding spring reinforced by said material, a pivotally mounted switch in said heating circuit and being held from actuation by said holding spring, said switch adapted to be released as the fusible material frees said holding spring.

9. In combination, a vessel, heating coils therefor, fusible material between said heating coils and vessel, a holding element held by said fusible material, a block mounted adjacent said fusible material, a switch blade pivoted to said block, one end of said blade being adapted to engage the holding element, the other end arranged to engage a pair of terminals on said block, said holding element released by said fusible material upon fusion of the same.

10. In a device of the class described, a heating vessel, a fusible seam for said vessel, a source of heat for the vessel, and a thermally controlled element for controlling said source of heat, said thermally controlled element being effected by a rise of temperature in the vessel before said fusible seam is.

11. In combination, a circuit, a fusible body arranged to be subject to the heat developed in said circuit, a holding member held from movement by said fusible body, a pivotal arm moving in the path of said holding member, a blade at the opposite end of said arm and insulated therefrom, and a pair of terminals in said circuit being engaged by said blade while said pivotal arm is restrained from movement by said holding member.

12. In combination, a casing, a heating vessel partially disposed within said casing, a heating coil for said heating vessel, a fusible body subjected to the heating of said coil, a switch controlled by said fusible member, a rod connected to said switch, said rod passing through the casing to permit control of the switch from outside the casing.

13. In combination, a casing, a heating vessel in said casing, a resistance coil for said vessel to heat the same, a thermally controlled switch in the heating circuit, terminals for said resistance coil comprising, a stud secured to the wall of the heating vessel and projecting outwardly therefrom, an insulated collar on said stud adjacent the vessel, washers on said collar between which conductor leads are carried, and a nut threaded on the end of the bolt.

14. In combination, a thermally controlled circuit breaker comprising, a block, a temperature controlled member adjacent to the block, a switch blade pivotally carried on the block, a detent finger on said blade adapted to engage said temperature controlled member, electrical contacts on the block, a spring tending to swing said switch blade out of engagement with said contacts, and insulation interposed between part of said switch blade and a conductor sleeve to prevent short circuiting of the current through said blade.

15. In combination, a thermally controlled circuit breaker comprising, a block member, a switch blade pivotally carried on said block member, a well adjacent to said block, a spring anchored in said well and embedded in a body of fusible material, one end of said spring projecting in the path of said switch blade, and a pair of contacts being engaged by said switch blade while said end of the spring projects in the path of the switch blade.

16. In combination, a circuit, a well containing a body of fusible material, said well being subject to a portion of the heat developed in said circuit, and a member surrounded by said fusible material and adapted to control the opening of the circuit, said member being provided with spring means tending to restore it to a predetermined position, said member being adapted to return to said predetermined position only while said fusible material is fused.

17. In a combination, a thermally controlled circuit breaker comprising a block, a temperature controlled member adjacent to the block, a switch blade pivotally carried on the block, a detent finger on said blade adapted to engage said temperature controlled member, electrical contacts on the block, a spring tending to swing said switch blade out of engagement with said contacts.

18. In combination, a closed casing having a bottom portion, a heating well carried by said portion, the upper portion of said casing and the well being adapted to contain a body of fluid, an electric circuit for heating said well, a thermally controlled element for breaking said circuit when the temperature rises to a predetermined point, said element being adapted to be reset to reestablish the circuit, and means connecting with said element and projecting out of said casing to permit resetting of said element.

19. In combination, a heating vessel adapted to contain a body of fluid, a casing therefor, a heating circuit for the vessel, a thermally controlled circuit changer subject to the heat applied to the vessel, said changer having a portion thereof extending between said vessel and said heating circuit in order to be subjected to the heat of the circuit before transferred to the vessel, means for re-setting said circuit changer comprising a member extending outside the casing.

20. In combination, a support, a vessel having a fusible joint by means of which said vessel is attached to said support, a heating element for a part of the vessel, and a circuit changer for the element having a thermally affected control element interposed in the path of the heat traveling to the joint.

21. In combination, a heating vessel, an electric heating element for the vessel, a portion of said heating vessel being subject to a change of condition by a predetermined rise in temperature, and a thermostatically controlled element disposed between said heating element and said vessel, said thermostatically controlled element being influenced by the heat before the heat affects said vessel.

22. A vessel for heating liquid, said vessel having a fusible seam, a fusible circuit controller in thermal contact with the vessel, a heater having a circuit controlled by said circuit controller, said fusible seam being disposed at a higher level than said fusible circuit controller.

23. In combination, a heating vessel adapted to contain a liquid, a heater for heating the liquid through a wall of the vessel, and a thermostatically controlled circuit breaker cooled by the liquid through a wall of the vessel, the operation of said thermostatically controlled circuit breaker being controlled by the water level.

24. In combination, a heating vessel adapted to contain a liquid, a heater for heating the liquid through a vertical wall of the vessel, said heater acting upon the vertical wall of said vessel, a thermostatic circuit breaker between the upper part of said heater and said vertical wall, said thermostatic circuit breaker being disposed along said vertical wall so that the lowering of the water level will uncover said thermostatic circuit breaker before completely uncovering said heater.

25. In combination, a heating vessel having a cylindrical well, a heating coil wrapped about the cylindrical surface of the well, and a thermostatic circuit breaker lying between said coil and the side of the vessel.

26. In combination, a steam table pan having a cylindrical well, a heating coil wrapped around said well, and a thermostatic circuit breaker lying in contact with the top part only of said heating coil.

In witness whereof, I hereunto subscribe my name, this 8th day of April, A. D., 1921.

ALFRED HERZ.